United States Patent [19]

Collins

[11] Patent Number: 4,698,678
[45] Date of Patent: Oct. 6, 1987

[54] TELEVISION SIGNAL PROCESSING APPARATUS

[75] Inventor: Mark C. Collins, Basingstoke, United Kingdom

[73] Assignee: Sony Corporation, Tokyo, Japan

[21] Appl. No.: 582,627

[22] Filed: Feb. 22, 1984

[30] Foreign Application Priority Data

Mar. 10, 1983 [GB] United Kingdom ................. 8306606

[51] Int. Cl.$^4$ .............................................. H04N 5/04
[52] U.S. Cl. .................................. 358/148; 358/149; 358/183
[58] Field of Search ............... 358/148, 149, 150, 160, 358/158, 21 R, 320, 337, 339, 185, 182, 22, 183

[56] References Cited

U.S. PATENT DOCUMENTS

| | | | |
|---|---|---|---|
| 3,525,808 | 8/1975 | Brown | 358/149 |
| 3,962,634 | 6/1976 | Russo | 358/149 |
| 4,148,070 | 4/1979 | Taylor | 358/160 |
| 4,218,705 | 8/1980 | Inaba et al. | 358/149 |
| 4,218,710 | 8/1980 | Kashigi et al. | 358/22 |
| 4,468,698 | 8/1984 | Kavoussi et al. | 358/148 |
| 4,599,650 | 7/1986 | Wilkinson | 358/148 |

OTHER PUBLICATIONS

"Put Video A/D Converters to Work", by Eugene Zuch Electronic Design (vol. 26, pp. 68-73), 8/2/78.

Primary Examiner—Tommy P. Chin
Assistant Examiner—David E. Harvey
Attorney, Agent, or Firm—Lewis H. Eslinger; Alvin Sinderbrand

[57] ABSTRACT

A television signal processing apparatus comprises a source of system television synchronizing signals, an analog-to-digital converter for converting an input television signal to digital form, a digital-to-analog converter for converting the digital signal back to analog form, a plurality of digital television signal processors arranged in series between the analog-to-digital converter and the digital-to-analog converter, at least one of the signal processors being capable of frame synchronizing the digital television signal in dependence on a frame pulse supplied to the signal processor, and means associated with the digital-to-analog converter for producing a frame pulse and for feeding the frame pulse back to each of the signal processors, or at least to a signal processor capable of frame synchronizing the digital television signal and for synchronizing the produced frame pulse relative to the system television synchronizing signals.

2 Claims, 4 Drawing Figures

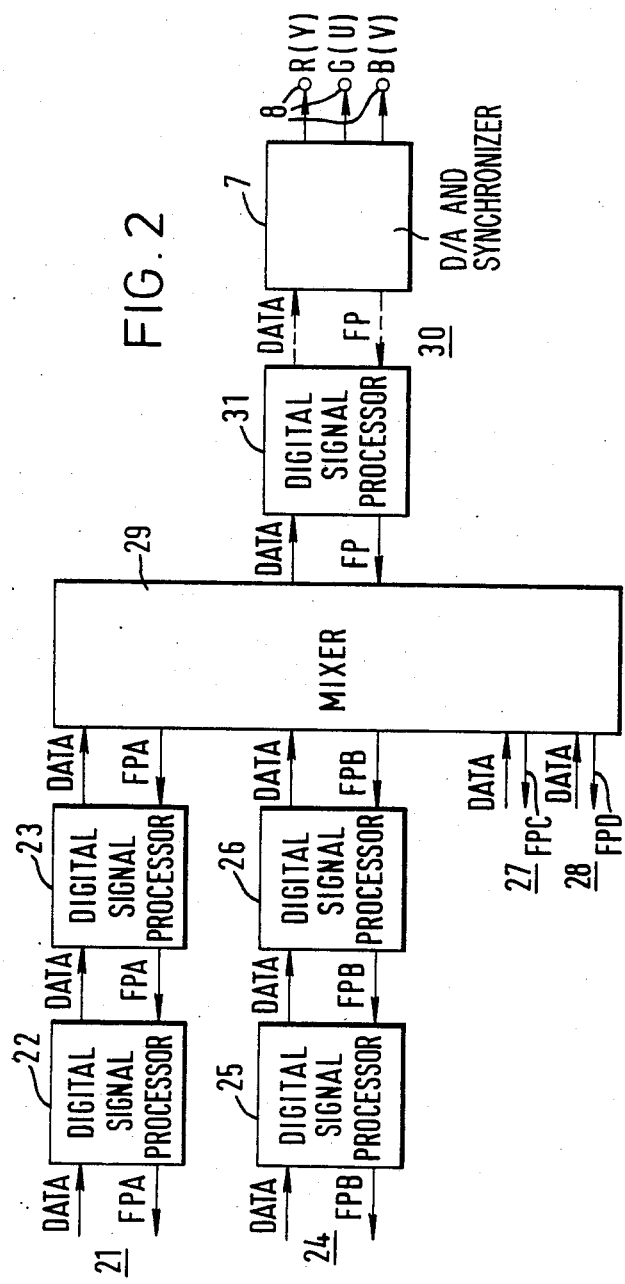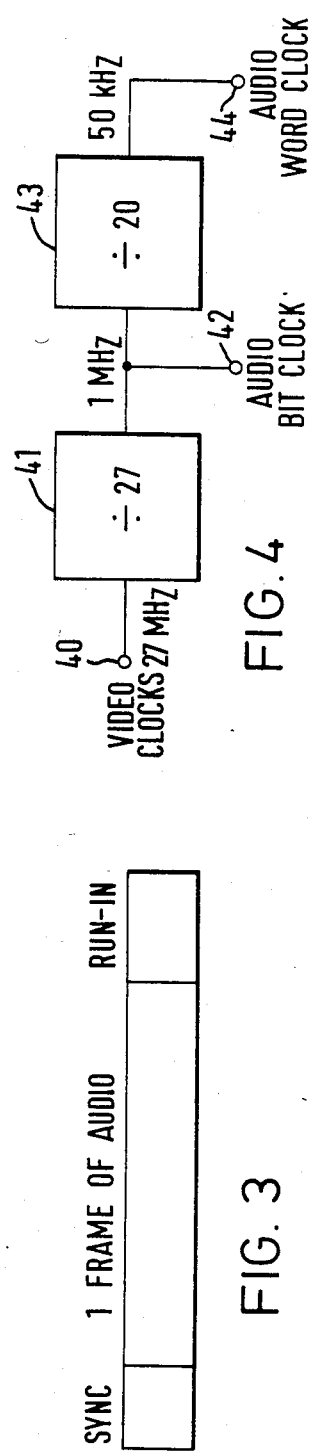

TELEVISION SIGNAL PROCESSING APPARATUS

BACKGROUND OF THE INVENTION

1. Field of the Invention

This invention relates to television signal processing apparatus.

2. Description of the Prior Art

When a moving picture is sampled, as with a television scanning system, the requirement for synchronization is introduced because each part of the signal thus produced must be uniquely identified in time and space. In analog television signals, line, field and frame synchronizing signals achieve this identification. However, the time constraints on these synchronizing signals relative to each point in the picture are very severe in order to achieve the necessary unique identification. In processing the analog television signal, this high degree of accuracy and stability must be maintained.

If the television signal is sampled again, as in a digital video processing system, the constraints change. Thus a sampling frequency is selected such that a precise number of samples are derived from each video scanning line, and the samples have a precise phase relative to each other. At the time of sampling the time constraints are higher than those for the analog system, but after sampling the time constraints may be relaxed because every sample can be uniquely identified merely by calculating its position relative to a digital line synchronizing signal and a digital frame synchronizing signal in terms of samples.

However, a problem arises in that the digital television signal has at some stage to be re-converted to an analog television signal and for that reason it has normally been the practice to maintain the analog timing constraints throughout the digital processing.

SUMMARY OF THE INVENTION

One object of the present invention is to provide an improved television signal processing apparatus.

Another object of the present invention is to provide a television signal processing apparatus in which the analog timing constraints need not be maintained throughout digital processing of a television signal.

Another object of the present invention is to provide a television signal processing apparatus in which framing is maintained by feeding back a frame pulse from a digital-to-analog converter to a preceding digital signal processor having a frame synchronizing capability.

According to the present invention there is provided a television signal processing apparatus comprising:

a source of system television synchronizing signals;

an analog-to-digital converter for converting an input television signal to digital form;

a digital-to-analog converter for converting the digital signal back to analog form;

at least one digital television signal processor arranged, and if more than one arranged in series, between said analog-to-digital converter and said digital-to-analog converter, the signal processor or at least one of the signal processors being capable of frame synchronizing said digital television signal in dependence on a frame pulse supplied to said signal processor; and means associated with said digital-to-analog converter for producing a frame pulse and for feeding said frame pulse back to said signal processor or to said at least one of the signal processors, and for synchronizing said produced frame pulse relative to said system television synchronizing signals.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 shows in block form a modification to part of the apparatus of FIG. 1;

FIG. 3 shows diagrammatically the format of audio data; and

FIG. 4 shows in block form that part of an embodiment concerned with the timing of audio data.

DESCRIPTION OF THE PREFERRED EMBODIMENTS

Figure 1:
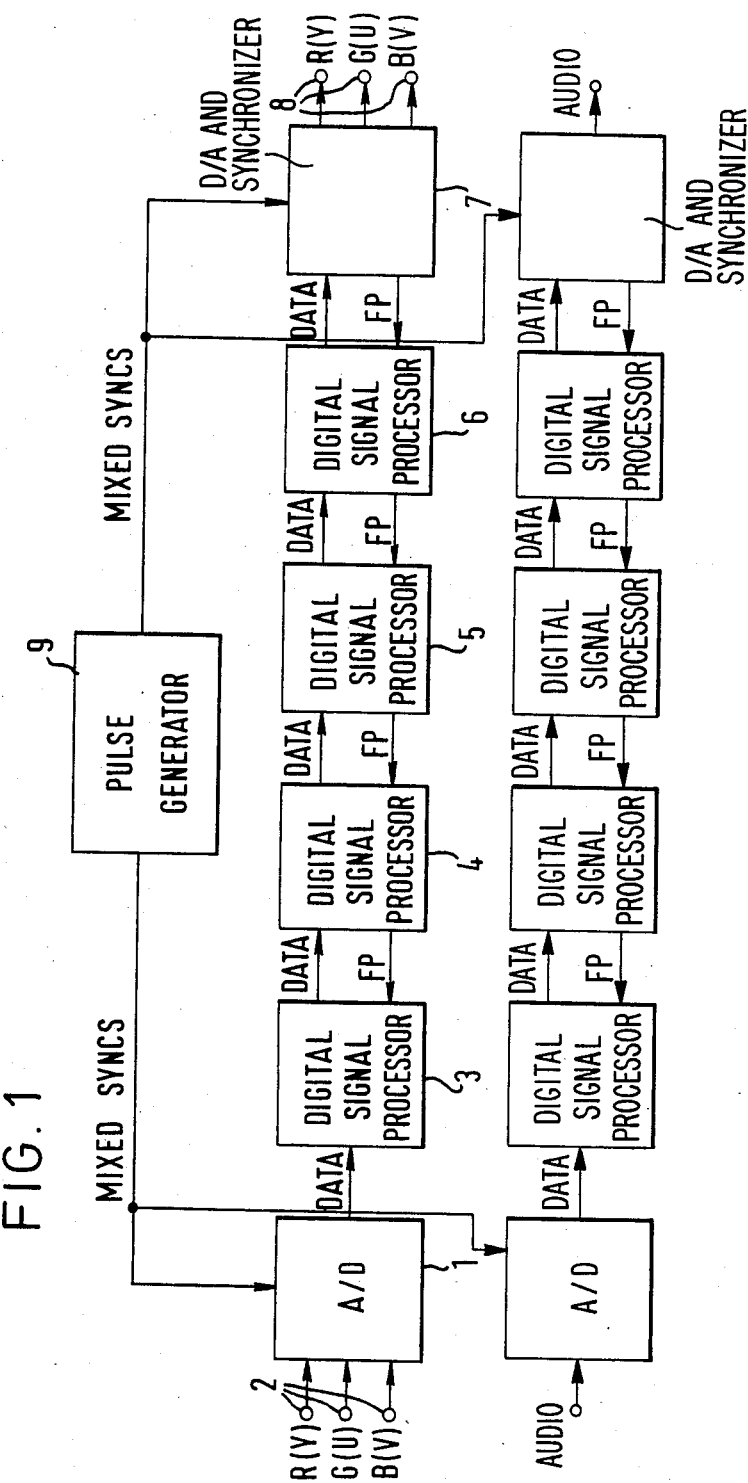
FIG. 1 shows in block form an embodiment of television signal processing apparatus according to the invention.

Before describing the embodiment, the time constraints of an analog television signal and a digital television signal, referred to briefly above, will be discussed in more detail.

When a moving picture is sampled to form an analog television signal, the requirement for synchronization is introduced, and this is achieved by providing line, field and frame synchronizing signals. The time constraints on these synchronizing signals are very severe. If the analog television signal is then sampled to form a digital television signal for digital processing, the time constraints become different. The number of samples in each video scanning line and the relative phases of the samples must be precise, but after sampling the time constraints may be relaxed, because each sample can be uniquely identified in terms of its position relative to a digital line synchronizing signal and a digital frame synchronizing signal. In other words, the position of a sample can be determined merely by counting samples. Any system which is to process the digital television signal can achieve the required timing accuracy, so long as the following conditions are met:

(1) The data signal to be processed must contain selected words indicating a digital frame synchronizing signal and a complete set of digital line synchronizing signals.

(2) The frame must contain a total complement of active samples, that is, samples containing picture information.

(3) The synchronizing signals must have the correct relative phase with respect to the active samples.

(4) The signal to be processed must contain and retain all the ancilliary user information, teletext if required, and all the required control and identification information, the precise form of this information depending on the particular system.

(5) The time separation of the digital frame synchronizing signals must be nominally equal to the analog frame period.

Embodiments of the invention operate to compensate for the delays which inevitably occur during digital processing of the television signal, by effecting any necessary re-synchronization at a digital-to-analog (D/A) converter which follows the digital processing stages and at which the digital television signal is re-converted back to an analog television signal.

The effect of this is that clock signals used in the digital processing stages do not need to be locked to the synchronizing signals of the analog television signal. The data input to any digital system will pass directly to a synchronizer, so that an internal system clock may be used. This clock will be reasonably stable and be of a nominally correct frequency. This will ensure that the analog and the digital processing may be separated, while the digital signal will be synchronized by a different technique.

Referring now to FIG. 1, an embodiment of television signal processing apparatus according to the invention comprises an analog-to-digital (A/D) converter 1 having three input terminals to which in operation are supplied three components of an analog color video signal. These components may, for example, be red, green and blue color component signals R, G and B, or a luminance and two color difference signals Y, U and V. From the A/D converter 1 the ouput data including digital synchronizing signals and any required clock signal is supplied to series-connected digital video signal processors 3, 4, 5 and 6. Four such digital signal processors 3 to 6 are shown merely by way of example, and in a practical system the actual number may be anything in a wide range from one upwards. So long as the, or if more than one at least one of the digital signal processors 3 to 6 is capable of frame synchronizing the digital video signal which is comprised in the data passing through the digital signal processors 3 to 6, the precise form of the digital signal processors 3 to 6 is not critical to the invention.

After passing serially through the digital signal processors 3 to 6, the data is supplied from the final digital signal processor 6 to a D/A converter 7 where analog component signals corresponding respectively to the three component signals supplied to the three input terminals 2 are derived and supplied to respective output terminals 8.

The analog part of the apparatus, this is to say the A/D converter 1 and the D/A converter 7, requires a source of mixed synchronizing signals, that is to say the line, frame and field synchronizing signals. These are developed by a system pulse generator 9.

The digital system, that is to say the digital signal processors 3 to 6, only require a frame pulse (FP), this being to ensure that condition (5) mentioned above is satisfied, that is to say that the separation of the digital frame synchronizing signals remains nominally equal to that of the analog frame period.

It is almost inevitable that some synchronization problem will arise in an apparatus as described with reference to FIG. 1, due to the time delays which will occur in some at least of the data handling circuits. In the embodiment, this loss of synchronization is compensated for by a synchronizer. The synchronizer need not necessarily be a separate unit, because many digital signal processors necessarily include synchronizers. Examples include digital video tape recorders, standards converters and special effects generators including field stores. In any practical system, therefore, it is likely that at least one of the digital signal processors 3 to 6 will already include a suitable synchronizer, but if this is not the case then a further digital signal processor which is in the form of or which includes a synchronizer must be added in the series path.

During operation, the video information comprised in the data is processed through the digital signal processors 3 to 6. The total delay from the input of the A/D converter 1 to the output of the D/A converter 7 must be an integral number of frames. So long as at least one of the digital signal processors 3 to 6 has the ability to frame synchronize, then the overall delay can be equalized automatically to an integral number of frames by a frame pulse which is fed back from the D/A converter 7 to each of the digital signal processors 6 to 3 in series. The D/A converter 7 includes a circuit arrangement which shifts the frame pulse in time until the incoming digital frame synchronizing signals contained in the incoming data supplied to the D/A converter 7 are correctly sychronized with the analog frame synchronizing signals contained in the system mixed synchronizing signals supplied to the D/A converter 7 from the pulse generator 9.

The frame pulse supplied by the D/A converter 7 is fed back by each digital signal processor 6 to 3 to the preceding one. In any practical system it is likely that sone of the digital signal processors 3 to 6 will introduce some fixed delay, and that of course remains unchanged, but as mentioned above, at least one of the digital signal processors 3 to 6 has synchronizing ability, and each of the digital signal processors 3 to 6 that has this ability will lock its output to the frame pulse. Those digital signal processors 3 to 6 which do not have synchronizing ability simply pass the frame pulse back unchanged to the preceding one.

As an alternative, the frame pulse supplied by the D/A converter 7 may be fed back only as far as the first (in the sense of nearest to the D/A converter 7) of the digital signal processors 3 to 6 which has synchronizing ability. For example, if the digital signal processor 5 has synchronizing ability, the frame pulse may not be fed back to the digital signal processors 4 and 3, which are simply allowed to free-wheel. Indeed there may be cases where it is not possible to feed the frame pulse back beyond a certain digital signal processor, for example, if that digital signal processor is a television standards converter.

The embodiment of FIG. 1 has only a single digital signal processing path, and FIG. 2, to which reference is now made, shows part of a modified embodiment having additional digital processing paths, data signals from which are united by a mixer.

Thus a first path 21 includes at least series-connected digital signal processors 22 and 23, while a second path 24 includes at least digital signal processors 25 and 26. There may be further paths, such as paths 27 and 28 not shown in detail.

The respective data signals in the paths 21, 24, 27 and 28 are combined by a mixer 29 and supplied to a further path 30 comprising, possibly, one or more digital signal processors 31. At the output end of the path 30 is the D/A converter 7 as shown in FIG. 1.

Each of the inputs to the mixer 29 must have its own independent frame pulse and these are designated frame pulse (FP) A, B, C and D respectively. The processing delays prior to the mixer 29 must be capable of being equalized relative to one another. Thus, each of the paths 21, 24, 27 and 28 must contain at least one digital signal processor capable of frame synchronizing the data, but additionally, if necessary, further synchronizers or mixed delays can be interposed to assist the delay equalization.

Frame store synchronizers must be associated with any asynchronous video signal source.

As a consequence of this method of handling the digital data, the individual frames of data will not necessarily have the same number of samples. Any samples lost or gained must be at the end of the frame, and the appropriate insertion or omission of samples is effected by the input synchronizer in the D/A converter 7.

Up to this point the handling of only the video signal components has been considered, and it is now necessary to consider the handling of the associated audio signal. It is to be noted that there is likely to be a differential between the audio and the video delays.

In embodiments of the invention, audio synchronization is achieved automatically in a very similar way to that used for the video components. For this it is necessary to start with an integral number of samples per picture frame and each audio A/D converter will therefore need to be supplied with the video line, field and frame synchronizing signals. In a 625 line, 50 field per second television system, the audio sampling frequency may be 1920 samples per frame, that is a frequency of 48 kHz. In a 525 line, 60 field per second television system the audio sampling frequency may be 1600 samples per frame, that is a frequency of 47.953 kHz, although it is preferred for standardization purposes, that the sampling frequency is the same in both cases. The same effect can be achieved by using the two different sampling frequencies mentioned, but adding invalid audio words in the run-in or spare space in each frame to bring the apparent number of audio words in the frame to a standard value. The added audio words are invalid both in the sense that they do not represent actual audio samples and they are formed of bit combinations which will be rejected as invalid on decoding.

So that asynchronous techniques similar to those used for handling the video components can also be used for the audio signal, the audio signal is blocked into frame groups of samples and transmitted at a higher frequency than the sampling frequency, in order to provide blank portions in each frame which can be variable in length. A suitable frequency is 50 kHz, which provides the necessary margin over the above-mentioned sampling frequencies, to avoid loss of active samples.

FIG. 3 shows diagrammatically the format of a frame of audio data, this comprising the initial frame synchronizing signal followed by the active samples making up one frame of audio data, followed by the run-in or spare space in the frame. The handling of the audio signal when in digital form will be basically the same as described with reference to FIG. 1 or 2 for the video components, and each audio D/A converter will provide its own frame pulse to feed back to the preceding digital audio signal processors so as to synchronize the input to the D/A converter in a similar way to that described with reference to the D/A converter 7 in FIG. 2. So long as the differential delay between the video components and the audio signal is less than one frame, the video and audio will automatically be synchronized. However, if the differential delay is more than one frame then some additional fixed or variable delay must be included in at least one of the signal paths. As with the video components, any asynchronous audio source will have to have an associated audio synchronizer.

The audio signal will generally be in serial form, as the bit rate will be low relative to that of the video components. It is convenient to select an audio bit clock frequency that can easily be derived from the video clock signals. For example, if the audio data is serialised using twenty bits per word, then the bit data rate would be 1 MHz and the necessary audio clock signals can be derived from the multiplexed video clock signal as indicated diagrammatically in FIG. 4. Thus, the 27 MHz multiplexed video clock signal is supplied from an input terminal 40 to a first frequency divider 41 which divides this frequency by twenty-seven to supply an output at 1 MHz to an output terminal 42 and an input to a second frequency divider 43. The second frequency divider 43 divides by twenty to provide a 50 kHz output to an output terminal 44. The clock signals available at the terminals 42 and 44 are therefore at the audio bit and word rate respectively.

If the connectors used in the digital audio signal path are nine-way D-type, it is feasible to transmit a bit clock signal, thereby eliminating the need for a phase locked loop circuit for clock signal recovery after the audio signal processing.

Embodiments of the invention can have the following advantages. Only a single connector is required for the digital interface, it not being necessary to provide a separate path for routing the synchronizing signals. The system as a whole will be self-synchronizing, regardless of the individual delays in the digital signal processing paths. It is possible to keep the digital and the analog systems substantially separate and in consequence the operational constraints on the digital signal processors are considerably relaxed. Depending on the sampling and clock frequency selected, it may be possible to derive the required clock signals by simple frequency division. It is not necessary to impose tight constraints on the relationship between the digital data and the frame pulse, but the digital systems can be accurately locked to mixed synchronizing signals if necessary.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A television signal processing apparatus comprising:
   a source of system television synchronizing signals;
   analog-to-digital converter means for converting an analog input television signal to a digital television signal organized in a series of frames;
   at least one digital television signal processor responsive to said analog-to-digital converter means, at least one of the signal processors being capable of synchronizing said frames of said digital television signal with respect to a frame pulse supplied to said at least one signal processor;
   digital-to-analog converter means responsive to said at least one signal processor, there being a signal path extending from said analog-to-digital converter means, through said at least one signal processor to said digital-to-analog converter means;
   means associated with said digital-to-analog converter means for producing said frame pulse, for feeding said frame pulse back to said at least one of the signal processors, and for synchronizing said frame pulse with respect to said system television synchronizing signals;
   said means associated with said digital-to-analog converter means being operative to adjust the timing of said produced frame pulse with respect to said system television synchronizing signals until said digital television signal is in a predetermined phase relation with said system television synchronizing signals at the input to said digital-to-analog converter means;

a mixer; and at least one additional signal processor arranged in at least one additional signal path between said analog-to-digital converter means and said mixer, digital signals in respective ones of said signal paths being mixed to derive a mixed digital signal which is supplied to said digital-to-analog converter means, and said produced frame pulse being respectively fed back through each of said signal paths to each of said signal processors therein, so that said signals being mixed by said mixer are all synchronized with each other.

2. A television signal processing apparatus comprising:

a source of system television synchronizing signals;

a first analog-to-digital converter for converting a video signal in an input television signal to a digital video signal organized in a series of frames;

a plurality of digital video signal processors arranged in series and responsive to said first analog-to-digital converter, at least one of said video signal processors being capable of synchronizing said frames of said digital video signal with respect to a first frame pulse supplied to said at least one video signal processor;

a first digital-to-analog converter responsive to said digital video signal processors;

means associated with said first digital-to-analog converter for producing said first frame pulse and for feeding said first frame pulse back to each of said video signal processors, and for synchronizing said first frame pulse with respect to said system television synchronizing signals;

a second analog-to-digital converter for converting an audio signal in said input television signal to a digital audio signal organized in a series of frames;

a plurality of digital audio signal processors responsive to said second analog-to-digital converter, at least one of said audio signal processors being capable of synchronizing said frames of said digital audio signal with respect to a second frame pulse supplied to said at least one audio signal processor;

a second digital-to-analog converter responsive to said digital audio signal processors;

means associated with said second digital-to-analog converter for producing said second frame pulse, for feeding said second frame pulse back to each of said audio signal processors, and for synchronizing said second frame pulse with respect to said system television synchronizing signals; and means for synchronizing said first and second frame pulses with respect to each other.

* * * * *